United States Patent [19]

Krum et al.

[11] Patent Number: 4,726,017
[45] Date of Patent: Feb. 16, 1988

[54] MULTIDROP DATA CONCENTRATOR COMMUNICATION NETWORK

[75] Inventors: Harry A. Krum, Indialantic; Felix L. Gotsa, Miami; Dennis McKenna, Clearwater; Gary Patterson, Largo; Jan M. Clairmont, Palm Bay; John L. Winters, Melbourne; Howard L. Cunningham, Satellite Beach, all of Fla.

[73] Assignee: Fla.

[21] Appl. No.: 736,263

[22] Filed: May 21, 1985

[51] Int. Cl.⁴ .......................... H04J 3/02; H04J 3/16; G05B 23/02
[52] U.S. Cl. ........................................ 370/85; 370/96; 340/825.08
[58] Field of Search ............... 370/85, 88, 90, 84, 370/96; 340/825.08; 379/92, 93

[56] References Cited

U.S. PATENT DOCUMENTS

| | | | |
|---|---|---|---|
| 3,924,077 | 12/1975 | Blakeslee | 370/56 |
| 4,398,287 | 8/1983 | Spencer | 370/85 |
| 4,427,898 | 10/1984 | Cholat-Namy | 370/84 |
| 4,472,712 | 9/1984 | Ault et al. | 370/85 |
| 4,481,626 | 11/1984 | Boggs et al. | 370/85 |

Primary Examiner—Douglas W. Olms
Assistant Examiner—Frank M. Scutch, III
Attorney, Agent, or Firm—Antonelli, Terry & Wands

[57] ABSTRACT

A multidrop network for effecting communications between a master site and a plurality of remote slave sites employs a multiport multiplexer at the master site and at slave sites, for interfacing multiple ports to a single telephone communication link. At the master site multiple/diverse types of data/signal processing equipments are coupled to respective ports of a master communications multiplexer or concentrator. Under internal processor control the master concentrator interfaces one of its input ports to an associated communications modem by way of which messages are exchanged over the telephone link. That input port of the master concentrator which is interfaced to its associated modem establishes a corresponding destination port of each remote concentrator that is coupled to a respective drop distributed along the telephone link. Interleaved between successive message (data) packets that are transmitted from the master site to addressed devices at remote sites are polling frames assembled by the master site concentrator which sequentially and periodically interrogate the respective ports of all remote concentrators for reply messages to be transmitted to master site terminal equipments which had previously sent requests for data.

22 Claims, 4 Drawing Figures (MASTER-TO-SLAVE)

(SLAVE-TO-MASTER)

MULTIDROP DATA CONCENTRATOR COMMUNICATION NETWORK

FIELD OF THE INVENTION

The present invention relates to communication systems and is particularly directed to scheme for effectively transparently multiplexing, regardless of protocol, messages between terminal devices at a central or master site and a plurality of remote or slave devices distributed along a single four-wire telephone signalling link.

BACKGROUND OF THE INVENTION

With the proliferation of digital processing and signalling equipment throughout the industrial and commercial business world, there have been developed a variety of communication systems and attendant protocols for interconnecting multiple data interface sites. One of the most commonly employed links used for this purpose has been the (four-wire) telephone link, which offers the convenience of being already in place and readily extended as new business sites are developed. The exchange of messages over such a link between data/signal processing units is typically effected by way of communication modems, which interface associated digital data/signal ports with the electromagnetic transmission highway of which the telephone link is configured, the modems operating at some prescribed baud rate and interfacing messages, between the telephone link and communicating ports, that have been formatted in accordance with a prescribed communications protocol.

Now although telephone links are typically readily accessible and convenient communication highways, they are not particularly inexpensive, since usage of the links is normally priced by the number of lines employed and the distance between drops. In a business environment such as a financial institution, where a central (business) office may require the capability of communicating with a number of geographically remote branch offices, the line charges for a plurality of respective dedicated lines which interface respectively different data/signal processing, input/output equipments (e.g. automated teller machines, administrative terminals, bank security (burglar alarm) signalling units) at a main office to those at each branch office can become a significant recurring expense.

An example of a typical communication network configured in this conventional manner is illustrated in FIG. 1, which shows a main or central office 10 and a plurality N of branch or remote offices 11, 12, ..., 1N that communicate with one another over a set (three in the example shown) of dedicated telephone lines 21, 22 and 23. Communications over telephone lines 21, 22 and 23 are carried out by a set of modems 31, 32 and 33, disposed at the main office 10, for interfacing a control processor 41, an automated teller machine controller 42 and a security controller 43, and respective modems 11-1, 11-2, 11-3; 12-1, 12-2, 12-3; ... 1N-1, 1N-2, 1N-3 at the branch offices 11, 12, ... 1N. These latter modems interface, in turn, the telephone lines 21, 22 and 23 with respective equipments (such as those types referenced above) 51, 52, 53; 61, 62, 63; ... 71, 72, 73.

In the communication network of FIG. 1, when equipment (e.g. cash box controller 42) at the master site 10 wishes to communicate with equipment at a branch office (e.g. automated teller machine 62 at branch office 12), it does so by polling the remote device over its dedicated telephone link, using the protocol and baud rate prescribed for that link. Namely, communications between the central office and a remote office are conducted by providing separate dedicated modem drops along separately dedicated telephone links, and polling the individual drops from the master or central site. As mentioned previously and as will be readily appreciated from the network configuration shown in FIG. 1, as the variety of different user equipment expands to meet the particular needs of the business of interest and as additional offices are added to meet customer needs, the line charges imposed by telephone company become a major expense item and may impact the choice (and thereby the flexibility) of a multi-branch communication network. Moreover, for each newly added drop there is additional delay introduced into the operation of the network, thereby limiting the practical limits of network application.

SUMMARY OF THE INVENTION

In accordance with the present invention, the considerable recurring cost and inherent added delay of conventional multidrop telephone communication links employing plural dedicated lines for respectively different types of user equipments is obviated by a scheme that enables the subscriber to use only a single telephone link between a central or main office and the multiple equipments of a plurality of branch or remote offices.

For this purpose the present invention employs a respective multiport multiplexer at the central office and at each branch office, for interfacing multiple ports to a single telephone communication link. At the central office multiple/diverse types of data/signal processing equipments are coupled to respective ports of a master communications multiplexer or concentrator. Under internal processor control the master concentrator interfaces one of its input ports to an associated communications modem by way of which messages are exchanged over the telephone link. That input port of the master concentrator which is interfaced to its associated modem establishes a corresponding destination port of each remote concentrator that is coupled to a respective drop distributed along the telephone link (e.g. at branch offices of the network). Each drop also includes a respective modem for interfacing the telephone link and that drop's concentrator. The respective ports of a remote concentrator are coupled to respective user equipments with which the equipments at the master site wish to communicate (e.g. automated teller machines, administrative terminals, security units).

Communications between the central office and the remote sites are full duplex (dual half-duplex over the dual pairs of the four-wire telephone link) to provide for the transmission of messages (both data, and requests for data (by polling equipments at branch offices)) from the central office to branch offices, and for the transmission of reply messages from polled equipments at the branch offices to the central office. When a message that has been transmitted from the master site is received at a remote concentrator, it is written to that port which corresponds to the port at the master site's concentrator to which the message was originally coupled from master site terminal equipment. At that drop whose corresponding port has connected to it a device the identity of which is contained in the message, the message is captured by the device via the port; otherwise it is ignored. When a remote port is polled for a data reply, it proceeds to transmit a response to equipment at the master site that had previously included a request for data in a message to a device couped to that port.

In accordance with the communication scheme employed, that portion of the (telephone) communication link which carries messages from the master site to the remote sites operates in a constant carrier mode, enabling all remote drops to maintain synchronization with the master site. Messages which are coupled to the respective ports of the concentrator at the master site are queued in local memory and then assembled in frames or packets of fixed length. Each packet includes a header or overhead information designating the port for whom the packet is intended. These packets are sent out sequentially from the master site and written to those ports of the remote site concentrators as identified by the port information in the packet header. The actual message from the master site terminal equipment contained within the packet will be captured by the particular device whose address is contained in the message.

Interleaved between successive packets are polling frames assembled by the master site concentrator which sequentially and periodically interrogates the respective ports of all remote concentrators for reply messages to be transmitted to master site terminal equipments which had previously sent requests for data (transmitted via one of the above-mentioned packets). Only that device to whom such a request had been sent will issue a reply to that port. As a result, when a port is polled, only one reply message (if available) at a time will be transmitted from a remote site to the master site, thereby avoiding reply collisions on the remote site-to-master site portion of the communications link.

Advantageously, because the communication scheme of the present invention is port oriented, rather than device oriented, only a single telephone link between the central office or master site and branch offices or remote sites is required. Moreover, with the use of multiport concentrators between user equipments and communication devices (modems) the number of modems required at the master site and at each drop along the link is reduced. In addition, since each multiport concentrator preserves all characteristics of an originally formatted message when coupling a prescribed port to the attendant modem, the interface between the port and the telephone communication link is effectively protocol transparent. As a result, to the user it appears that a device-to-device communication path is provided.

DETAILED DESCRIPTION

Figure 1:
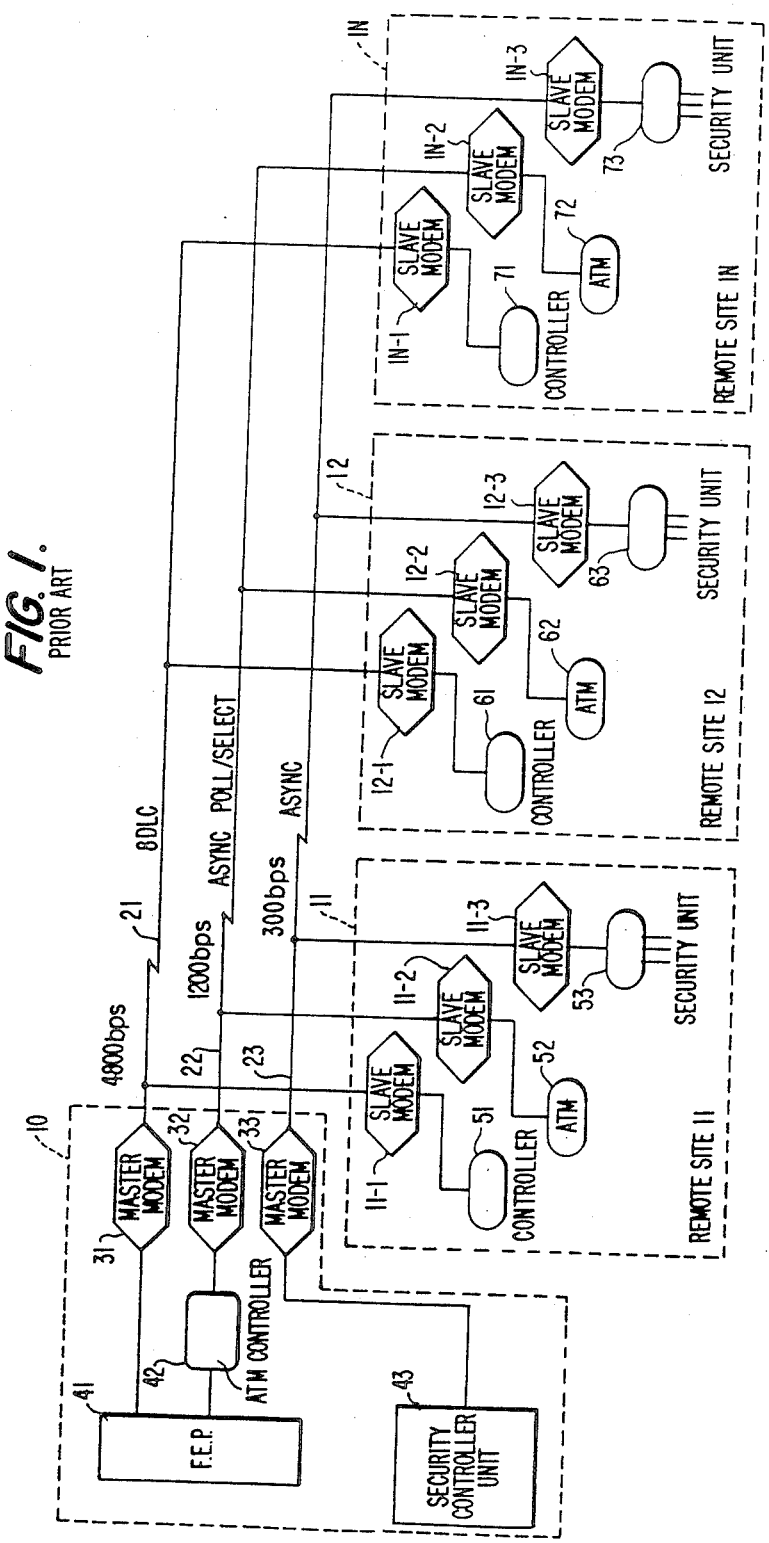
FIG. 1 is a schematic block diagram of a conventional multi-link communications network interconnecting multiple digital equipment users with one another over a set of dedicated telephone links.

Before describing, in detail, the particular improved multidrop concentrator communication scheme in accordance with the present invention, it should be observed that the present invention resides primarily in a novel structural combination of conventional communication and data/signal processing circuits and not in the particular detailed configurations thereof. Accordingly, the structure, control, and arrangement of these conventional circuits have been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. In addition, various electronic data processing equipment have been appropriately consolidated and simplified in order to emphasize those portions that are most pertinent to the present invention. Thus, the block diagram illustrations of the Figures do not necessarily represent the mechanical structural arrangement of the exemplary system, but are primarily intended to illustrate the major structural components of the system in a convenient functional grouping, whereby the present invention can be more readily understood.

NETWORK ARCHITECTURE

Figure 2:
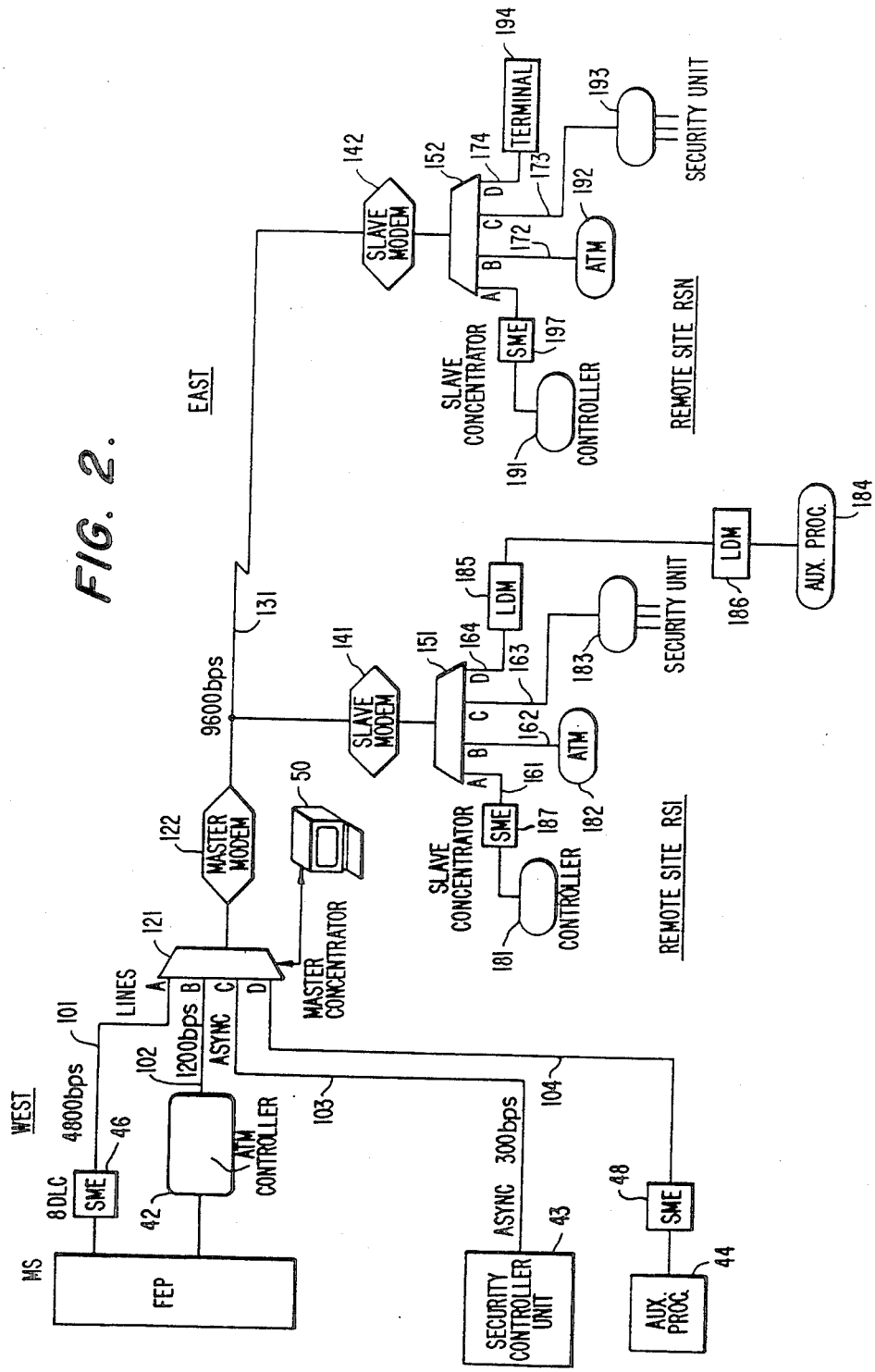
FIG. 2 is a schematic block diagram of a multidrop concentrator communications network interconnecting multiple digital equipment users with one another over a single telephone link.

Referring now to FIG. 2, a schematic block diagram of the multidrop concentrator communication network of the present invention is illustrated as comprising a master site MS and a plurality of remote sites RS1 ... RSN, which communicate with one another over a communication link 131, such as a standard inter-office four-wire telephone link, provided by the telephone company. As described briefly above, the master site MS is located at the central or main office of a multi-branch business, such as a bank, while the remote (slave) sites RS are located at the respective branch offices of the bank, which are typically geographically separated from each other and from the main office. In FIG. 2, while only two remote sites RS1 and RSN have been shown, in order to simplify the drawing, it should be observed that the number of remote sites is not limited to two or any particular number. It should also be observed that the exemplary environment of the present invention is not restricted to financial institutions or to any particular number of offices or sites associated with any specific business. The environment described here is simply to provide a practical illustrative example of the application of the invention in solving a current business communications problem.

In accordance with the hierarchy of a master site multiple remote (slave) site communication network to which the present invention is directed, all data communications, whether they constitute the vectoring (writing to a particular device) of data, or a request for data (reading data from a particular device) are initiated from the master site MS and directed along the communication link 131 to the remote sites RS. The remotes sites do not communicate with one another and they do not control communications on the communication link. The network is a master-slave network in the classical sense.

In the exemplary environment of a financial institution, the main office (master site) may include a plurality of control terminal equipments that communicate with associated remote terminal equipments at the branch offices (remote sites). For example, the master site may include a principal intelligent controller or front-end processor 41, such as an IBM 3705 Data Processing System, that may communicate directly with terminal equipment at remote sites and/or control other local master site equipment from which separate communications to the remote sites are issued. In this regard, front-end processor 41 may control an automatic teller machine (ATM) controller 42 (such as a Diebold 9510 ATM Controller). For the exemplary environment of a bank described here, the main office also typically would include a supervisory security alarm system for both the main office and all branch offices. The supervisory system is shown in FIG. 1 as a security controller unit 43, such as a Mosler Security Controller. Finally, additional auxiliary processing capability, such as a auxiliary processor (e.g. IBM 3705 processor) 44, is provided.

As is typically the case, because each of the various terminal equipment types employed by the main office has been developed by a separate manufacturer for addressing a particular user problem, the signalling characteristics of each device will not necessarily be the same. For example, an IBM 3705 processor may have a baud rate of 4,800 bps and synchronous data link communications protocol. An automated teller machine controller, such as the above-referenced Diebold 9510 Controller, may have a baud rate considerably less than that of the processor (for example 1,200 bps) and operate asynchronously. The security alarm controller unit 43 may also run asynchronously and at a much lower baud rate (e.g. 300 bps). Because of these differences in protocol and baud rate, it has been standard practice in the art to employ separate communication links (e.g. telephone lines) and/or protocol conversion devices for each device, which, together, add significant cost and overhead.

According to the present invention, however, there is provided a considerably simplified communication scheme between diverse types of terminal equipment and remote user sites, without having to employ separate dedicated lines for the different communication formats and without having to employ a complex protocol conversion scheme to permit the sharing of a common link by different types of devices.

For this purpose, as shown in FIG. 2, the present invention employs respective terminal port-communication link concentrators (with attendant modems) at each of the master site (concentrator 121 with attendant modem 122 at master site MS) and respective remote sites (e.g. concentrator 151 with attendant modem 141 at remote site RS1). The modems are coupled to a shared communication link, such as a standard full duplex (dual-half duplex) four-wire telephone link 131. Each concentrator has a set of respective ports to which terminal equipments at the respective site are coupled. At the master site MS, for example, a master multiple port-communication link concentrator 121 has a plurality (four in the example shown) of ports A,B,C,D respectively coupled, via links 101, 102, 103 and 104, to the above mentioned terminal equipments employed at the master site. Namely, the front-end processor 41 is coupled over link 101 to port A, ATM controller unit 42 is coupled over link 102 to port B, security controller unit 43 is coupled over link 103 to port C and auxiliary processor 44 is coupled over link 104 to port D. Also shown coupled in link 101 between front-end processor 41 and port A of concentrator 121 and in link 104 between auxiliary processor 44 and port D of concentrator 121 are respective clock source coupling units 46 and 48. Each of these units may take the form of a synchronous modem eliminator (such as an SME-3 manufactured by ARK Electronic Products Inc.). These units supply clock signals for clocking data communications with the processors 41 and 44 and interface communications between the processors and ports A and D. Modem eliminators 46 and 48, like the remaining components of FIG. 2, are commercially available items and, as such, no details of the configuration of these components need be described here. Instead, where desired, attention may be directed to the manufacturer's literature and to the components themselves for more specific description of the interconnections and detailed operations thereof.

The multi-terminal port-communication port concentrator 121, which interfaces the terminal communication links that are coupled to ports A-D and an attendant master modem 122 which transmits and receives digital data communications over telephone link 131, preferably comprises a programmable intelligent communications adaptor, such as model ICA-4 manufactured by ARK Electronic Products Inc. This adaptor interfaces a plurality of data/signalling ports (A,B,C,D in the example described here) having arbitrary message formats and provides a serial interface to an associated data transmission link (here the coupling to modem 122). Concentrator 121 contains an internal control processor which is externally programmable and may be augmented by an on-line operator terminal 50. Data communications between terminal equipment ports A-D and the serial line to modem 122 are buffered through internal dynamic random access memory. The attendant master modem unit 122 which couples the input/output serial communications port of the master concentrator 121 with the telephone link 131 preferably comprises a synchronous long haul modem, such as an MPX 96 long haul modem manufactured by Paradyne Corporation.

Again, for more specific details of the configuration and operation of the programmable adaptor of which the master concentrator unit 121 is configured, attention may be directed to products information provided by ARK Electronic Products Inc., specifically relating to the ICA-4 programmable intelligent communications adaptor. In order to facilitate the present description, rather than provide a detailed explanation of the firmware which controls the operation of the adaptor, the description infra will present a discussion of the communication sequence and protocol employed for vectoring data from master site terminal equipments to remote site equipments, for polling remote devices from the master site terminal equipments, and for transmitting data from polled remote site devices over the communication link back to a master device.

The communications equipment which is provided at each remote site RS to interface the telephone link 131 with remote terminal equipment is substantially identical to that provided at the master site MS. More particularly, remote site RSI includes a slave modem 141 which couples the telephone link 131 to an associated slave concentrator unit 151. Like the master modem 122 and master concentrator unit 121 at the master site MS, slave modem 141 and slave concentrator 151 interface telephone link 131 and a plurality of terminal equipments to which ports A,B,C,D of the slave concentrator 141 are coupled. In the example shown in FIG. 2, port A of concentrator 151 is coupled over a link 161 through a synchronous modem eliminator/clock source unit 187 to a remote processor 181. Port B is coupled over link 162 to an electronic cash box 182 (automated teller machine) 182, while port C is coupled over link 163 to a burglar alarm/security terminal unit 183. For purposes of the present description, it may be assumed that remote site RS1 corresponds to a bank branch office. Located within the same building but remote (requiring a substantial length of communication cable) with respect to the office itself may be an additional processing unit 184, which is coupled over link 164 to Port D of concentrator 151. In order to accommodate the length of the communications cable of which link 164 is comprised, a pair of additional signal coupling units 185 and 186 are provided. Each of these units may comprise a limited distance modem, such as model LDM-5 manufactured by ARK Electronic Products Inc. for providing the necessary signal amplification and interfacing between port D and auxiliary processor 184 over the cable distance between the branch office itself and the location of auxiliary processor at another portion of the building.

Each of remote terminal units at the branch office, namely controller 181, automated teller machine 182, burglar alarm/security terminal unit 183 and auxiliary processor 184, are individual devices to whom data may be directed or data requested by front-end processor 41, automated teller machine controller 42, security controller unit 43 and auxiliary processor unit 44, respectively, at the main office or master site MS. Similarly, additional remote terminal units, such as the above components, may be coupled to respective ports A, B, C, D of additional slave concentrators disposed within further branch offices or remote sites, including remote site RSN. Again, these units, per se, are not shown in FIG. 2, in order to simplify the drawing. What is significant about the location of these units is the fact that common functional terminal units are coupled to the same port of each of the concentrators at the remote (slave) sites and the master sites. By virtue of these port allocations, each of the terminal equipments at the master site, such as automated teller machine controller unit 42, conducts data communications between slave devices at remote sites as though there were a direct connection between the controlling terminal and the device at the remote sites. The contents of a data communication generated by a master site control terminal or by a remote site device in response to a request for data from a master site control terminal are without knowledge of the port interface connections of the concentrators 121. Thus, automated teller machine controller 42, when sending data to an electronic cash box, simply formats the message according to its own protocol and forwards the message over its local communication link 104 to the master site concentrator. It assumes that it has a direct communication link to all remote electronic cash boxes, so that any reply from an addressed slave device will be directed to the control terminal 42 at the master site.

COMMUNICATIONS FORMAT
MASTER SITE-TO-REMOTE SITE SIGNALLING

Figure 3:
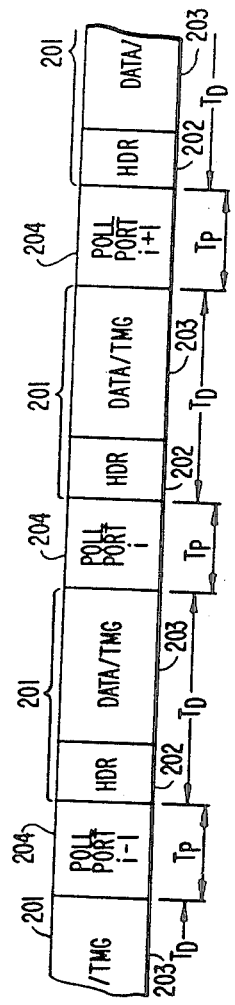
FIGS. 3 and 4 are a diagrammatic illustration of the polling/signalling format employed in the network of FIG. 2.

Referring now to FIG. 3, there is shown the communications format of messages transmitted from the master site MS over telephone link 131 to a remote site RS. As described above, transmissions from the master site MS to a remote site RS take place over one of the half-duplex pair of the four-wire telephone link 131. In the following explanation, transmissions from the master site MS to a remote site RS will be considered to be in the west-to-east direction. Conversely, response messages from a remote site RS over the other half-duplex pair of the four-wire telephone link 131 to the master station MS will be considered east-to-west communications.

When terminal equipment that is coupled to a respective one of the ports A-D of master concentrator 121 wishes to transmit a message to a remote device it raises a request-to-send signal at its associated port, which causes data carrier transition that is detected by the concentrator. Concentrator 121 then achieves synchronization (if the associated terminal-to-point link is synchronous) and begins capturing the data stream generated by the terminal equipment, without regard to data content. Thus, as a respective message is delivered to one of the ports A-D of master concentrator 121 from the terminal equipment in the master site, it is queued in an internal buffer contained within the master concentrator 121, each queue being associated with a particular port. When terminal equipment has completed its message, it lowers the request-to-send signal, whereby the concentrator no longer senses data carrier and stops capturing data.

In accordance with the communications format employed over the link 131, the master concentrator successively scans the message queues associated with ports A-D and assembles the contents of the queues into frames or packets for transmission over the west-to-east portion of the link 131. Each packet consists of the actual data that was delivered to the port from the associated terminal equipment and a header, or overhead information, prefixed at the front-end of the data by the connector which controls the delivery of the packet to the ports of the remotes sites. This format is shown in FIG. 3 wherein successive data/timing packets 201, each having a prescribed length Td, are shown as including header portions 202 followed by data/timing portions 203. If the contents of the buffer, into which messages from terminal equipment at the master site have been queued, are insufficient to fill portion 203 of a packet, additional bits, termed timing bits, are tail-ended to the data to fill out the packet and thereby maintain a source of synchronization signals over the west-to-east link for each of the remote sites.

As mentioned above, the overhead or header portion 202 of each data packet contains the port identification of the message sourcing terminal equipment (and thereby the corresponding port of the receiving device for whom the data is intended). The data portion 203 of the packet will contain, as part of its information, the identification of a specific device as addressed by the terminal equipment at the master site. The precise contents of the message portion of the packet are not altered in any way by the present invention, so that any errors in a message formatted by the master site terminal equipment will be carried forward to the remote sites for whom the message is intended.

Also shown in FIG. 3 are respective polling frames 204, interleaved between the successively transmitted data frames 201. Each polling frame has the same length Tp and essentially comprises a port identification code and a code corresponding to a request for transmission from the port identified by the code at a remote site, assuming that that port has data to send.

More specifically, as pointed previously, one of the main features of the present invention is the fact that rather than poll devices, the communication scheme polls ports. If terminal equipment at the master site has sent a message within a previously transmitted data packet requesting a return of data from a device at a remote site, that device at the remote site, upon capturing the message, will have responded by coupling a data reply message to its own port to be buffered in the internal memory of the slave concentrator to which that device is coupled. When data is loaded into a port for transmission over the communication link, a request to send flag it raised at that port. Subsequently, when that port is polled, namely it receives a polling request transmitted from the master site, whatever concentrator contains the data that has been queued as a response to that port will initiate a transmission through its modem onto the east-to-west communication link.

In the message format diagram of FIG. 3, the interleaving of the polling frame between the data frames is such that the ports are polled sequentially and periodically. Thus, on the west-to-east portion of the communication link 131, there is a continuing source of data communications signals, specifically successively transmitted data/timing frames and port poll frames interleaved in the manner shown in FIG. 3. As will be explained below, during the transmission of a reply message from a polled port the issuing of further polls to ports is interrupted, so that successive data frames are transmitted without the interleaving of any polls to ports until the master site sees and end of transmission for a polled port. This action is taken to prevent more than one polled device from responding at a time and thereby preventing transmission collisions on the east-to-west link.

REMOTE SITE-TO-MASTER SITE SIGNALLING

Figure 4:
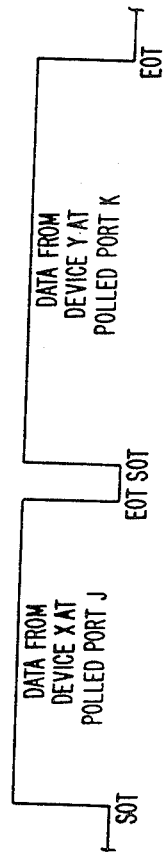

FIG. 4 shows the signalling format on the east-to-west or slave-to-master portion of the communication link 131. As pointed out above, when a port at a remote device is polled, and assuming that a device which is coupled to that port had been previously requested to transmit data by a message packet that had been forwarded over the west-to-east portion of the link from the master site, the device will have asserted a request to send. In response to the poll, the concentrator grants the request and turns on a local carrier through which messages are transmitted over the east-to-west portion of the link. The data which has been queued in memory in the remote concentrator is then clocked out onto the east-to-west portion of the link and transmitted to the master site. For an exemplary device X, this action is shown in FIG. 4 by a data response message 205 of some arbitrary length beginning with a start of transmission point SOT to end of transmission point EOT.

As pointed out above, during the transmission of data from device X from the remote site RS back to the master site MS during data frame 205, polling by the master site is interrupted, in order to prevent collisions on the east-to-west portion of the link. Instead, data/timing frames are successively transmitted back-to-back, to maintain constant carrier/synchronization on the west-to-east portion of the transmission link 131.

Upon completion of the transmission of the data frame 205, the master site detects the end of transmission and begins a new the sequential polling of ports at remote devices. A further data frame in response to a port polled from some device Y is shown in FIG. 4 as data frame 206.

As will be appreciated from the foregoing description of the configuration and operation of the present invention, the communication scheme described above offers a considerable improvement over conventional multi-drop networks which, as noted previously, typically require separate dedicated lines to handle different protocols and which typically poll devices at each drop. In accordance with the present invention, through the use of a multiplex/concentrator communication scheme which polls ports, rather than devices, a considerably less costly and less complex network is provided. Since the concentrators do not convert the protocol of messages coupled to their ports to a different protocol for transmission, but rather simply envelope the data which is queued in memory as received from an associated terminal, interfacing circuitry is less complicated and thereby more reliable. At the receiving end of a communication, where the concentrator effectively "deenvelopes" the message, removing the overhead for steering the message to the appropriate port, what appears at the port to be captured by the attendant device is exactly what was sent by the originating terminal. Thus, as far as the originating terminal and the receiving terminal are concerned, the protocol in accordance with which they are operating is unaffected and the link makes it appear that there is a direct connection between the two terminals. Since all ports are polled simultaneously, rather than sequentially as in the prior art, the adding of additional drops does not slow the system down. Thus, the capacity of a network configured in accordance with the present invention is effectively unlimited.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. For use with a communications link capable of supporting the transmission of messages between a plurality of first devices coupled to a first site and second devices coupled to a plurality of second sites, a communication network comprising:

at said first site,
first means, having a plurality of first ports respectively coupled to said plurality of first devices, and a second port coupled to said communication link, for transmitting messages, coupled to said first ports from said first devices, over said communication link to said plurality of second sites, and for coupling messages, received over said communication link from said second sites, to selected ones of said first ports to be thereby delivered to the first devices coupled thereto; and at each of said second sites,
second means, having a first port coupled to said communication link and a plurality of second ports coupled to respective ones of said second devices, for transmitting messages, coupled to said second ports from said second devices over said communication link to said first means at said first site and for coupling messages received over said communication link from said first site to selected ones of said second ports; and wherein said first means includes means for transmitting a polling message by way of which the same prescribed port of each of said second means is polled for a message from its associated second device coupled thereto to be transmitted to said first site, whereby a message to be transmitted from a second device that is coupled to said same prescribed port is transmitted to said first means.

2. A communication network according to claim 1, wherein a message contains a first portion identifying a second port of said second means to which the second device for which the message is intended is connected, and a second portion containing information to be delivered to said second device.

3. A communication network according to claim 1, wherein said first means includes means for periodically and sequentially transmitting said polling message to each of said second means.

4. A communication network according to claim 3, wherein said first means includes means for interleaving the contents of messages coupled to said first ports thereof from said first devices with polling messages.

5. A communication network according to claim 1, wherein a message contains the identity of a respective one of said second devices, whereby at that prescribed port of a second means to which said respective one of said second devices is coupled, said message may be captured by said respective second device.

6. A communication network according to claim 5, wherein said second means includes means for causing a message that is coupled from a second device to a second port thereof to be transmitted over said communication link for delivery to a corresponding first port of said first means, and thereby be coupled to that one of said first devices which is coupled to said corresponding first port of said first means, in response to receipt of a message from said first means polling said second port.

7. A communication network according to claim 1, wherein said first means comprises means for receiving, at the first ports thereof, messages from said first devices at respective baud rates as generated by said first devices and for transmitting said messages over said communication link at a prescribed baud rate independent of any of the baud rates generated by said first devices.

8. A communication network according to claim 7, wherein each of said second means includes means for receiving, at the first port thereof, messages transmitted over said communication link at said prescribed baud rate, and for coupling respective ones of said messages at their designated ports to respective second devices coupled thereto at the respective baud rates of said first devices.

9. A communication network according to claim 1, wherein said first means comprises means for receiving, at the first ports thereof, messages from said first devices at respective baud rates as generated by said first devices and for transmitting said messages over said communication link at a prescribed baud rate irrespective of any data message content of said messages.

10. A communication network according to claim 9, wherein said prescribed baud rate is independent of any of the baud rates generated by said first devices.

11. A communication network according to claim 10, wherein each of said second means includes means for receiving, at the first port thereof, messages transmitted over said communication link at said prescribed baud rate, and for coupling respective ones of said messages at their designated ports to respective second devices coupled thereto at the respective baud rates of said first devices.

12. For use in a communications link capable of supporting the transmission of messages between a plurality of first devices coupled to a first site and second devices coupled to a plurality of second sites, a method of communicating between respective ones of said first devices and respective ones of said second devices over said communication link comprising the steps of:

(a) providing, at said first site, first means, having a plurality of first ports respectively coupled to said plurality of first devices, and a second port coupled to said communication link, for transmitting messages, coupled to said first ports from said first devices, over said communication link to said plurality of second sites, and for coupling messages, received over said communication link from said second sites, to selected ones of said first ports to be thereby delivered to the first devices coupled thereto;

(b) providing, at each of said second sites, second means, having a first port coupled to said communication link and a plurality of second ports coupled to respective ones of said second devices, for transmitting messages, coupled to said second ports from said second devices, over said communication link to said first means at said first site and for coupling messages received over said communication link from said first site to selected ones of said second ports; and (c) at said first site, causing said first means to transmit a polling message by way of which the same prescribed port of each of said second means is polled in correspondence with an associated prescribed one of said first ports of said first means, whereby a message to be transmitted from a second device that is coupled to said same prescribed port is transmitted to said first means.

13. A method according to claim 12, wherein a message contains a first portion identifying a second port of said second means to which the second device for which the message is intended is connected, and a second portion containing information to be delivered to said second device.

14. A method according to claim 12, wherein step (c) comprises causing said first means to periodically and sequentially transmit said polling message to each of said second means.

15. A method according to claim 14, wherein step (c) comprises causing said first means to interleave the contents of messages coupled to said first ports thereof from said first devices with polling messages.

16. A method according to claim 12, wherein a message contains the identity of a respective one of said second devices, whereby, at that prescribed port of a second means to which said respective one of said second devices is coupled, said message may be captured by said respective second device.

17. A method according to claim 16, further including the step of (d) causing a message that is coupled from a second device to a second port of said second means to be transmitted over said communication link for delivery to a corresponding first port of said first means, and thereby coupled to that one of said first devices which is coupled to said corresponding first port of said first means, in response to receipt of a message from said first means polling said second port.

18. A method according to claim 12, wherein said first means comprises means for receiving, at the first ports thereof, messages from said first devices at respective baud rates as generated by said first devices and for transmitting said messages over said communication link at a prescribed baud rate independent of any of the baud rates generated by said first devices.

19. A method according to claim 18, wherein each of said second means includes means for receiving, at the first port thereof, messages transmitted over said communication link at said prescribed baud rate, and for coupling respective ones of said messages at their designated ports to respective second devices coupled thereto at the respective baud rates of said first devices.

20. A method according to claim 12, wherein said first means comprises means for receiving, at the first ports thereof, messages from said first devices at respective baud rates as generated by said first devices and for transmitting said messages over said communication link at a prescribed baud rate irrespective of any data message content of said messages.

21. A method according to claim 20, wherein said prescribed baud rate is independent of any of the baud rates generated by said first devices.

22. A method according to claim 21, wherein each of said second means includes means for receiving, at the first port thereof, messages transmitted over said communication link at said prescribed baud rate, and for coupling respective ones of said messages at their designated ports to respective second devices coupled thereto at the respective baud rates of said first devices.

* * * * *